United States Patent [19]

Hamilton

[11] Patent Number: 4,763,988

[45] Date of Patent: Aug. 16, 1988

[54] PERISCOPE APPARATUS COMPRISING A SINGLE INVERTED PYRAMID

[75] Inventor: James G. Hamilton, Glasgow, Scotland

[73] Assignee: Barr & Stroud Limited, Glasglow, Scotland

[21] Appl. No.: 913,054

[22] Filed: Sep. 26, 1986

[30] Foreign Application Priority Data

Sep. 28, 1985 [GB] United Kingdom ............... 8523974

[51] Int. Cl.4 ...................... G02B 23/08; G02B 23/16
[52] U.S. Cl. .................................. 350/319; 350/540; 350/1.1; 350/276 R
[58] Field of Search ........................ 350/319, 540–544, 350/546, 587, 588, 321, 276 R, 538, 1.1, 1.2

[56] References Cited

U.S. PATENT DOCUMENTS

| | | | |
|---|---|---|---|
| 778,694 | 12/1904 | Mustin | 350/540 |
| 1,275,975 | 8/1918 | Murdock | 350/588 |
| 1,308,283 | 7/1919 | Grebe | 350/543 |
| 1,311,087 | 7/1919 | Olmsted | 350/540 |
| 4,150,875 | 4/1979 | Stachiw et al. | 350/319 |

FOREIGN PATENT DOCUMENTS

| | | | |
|---|---|---|---|
| 309235 | 11/1919 | Fed. Rep. of Germany | 350/540 |
| 2089519 | 6/1982 | United Kingdom | 350/540 |

*Primary Examiner*—Jon W. Henry
*Attorney, Agent, or Firm*—Pennie & Edmonds

[57] ABSTRACT

A periscope head (10) is formed by a hollow structure of inverted pyramidal form connected to the periscope mast in the vicinity of the apex of the pyramidal form. The exterior surfaces (11, 12) of the head (10) are highly reflective and are substantially planar and they include a window (13) for transmission of radiation to an optical device within the head (10). The geometry and reflectivity of the head (10) render it relatively indistinguishable, in use, from the surrounding sea.

7 Claims, 1 Drawing Sheet

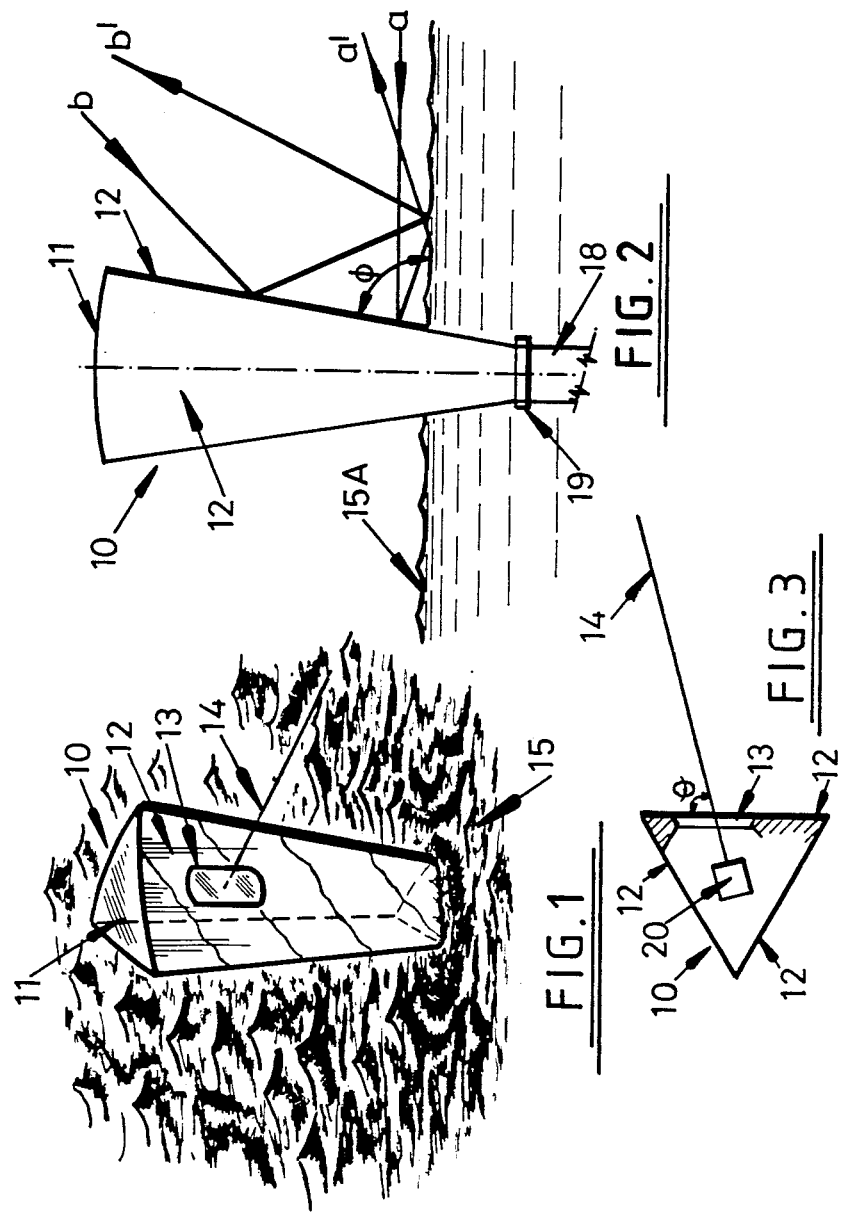

PERISCOPE APPARATUS COMPRISING A SINGLE INVERTED PYRAMID

This invention relates to apparatus for forming a periscope head, particularly for submarine use.

At the present time the known apparatus for forming a periscope head is designed to be as compact as possible in order to minimise the risk of detection. However, modern periscopes are of increasing sophistication and require the presence at the periscope head of several optical devices and there is therefore a conflict between providing accommodation for such devices at the periscope head and minimising the external dimensions of the periscope head.

It is an object of the present invention to provide new and improved apparatus for forming a periscope head.

According to the present invention there is provided apparatus for forming a periscope head, said apparatus comprising a hollow structure of inverted pyramidal form, the structure being adapted for connection to a periscope mast in the vicinity of the apex of the pyramidal form and having exterior surfaces which are highly reflective, at least one of said exterior surfaces incorporating a window for transmission of radiation to an optical device located within said structure and forming part of the periscope.

By virtue of the fact that the apparatus is of pyramidal form and externally highly reflective the probability of detection by a third party is very small in the visible region of the spectrum, in the infrared region of the spectrum and also at radar wavelengths, in part because the apparatus is relatively indistinguishable, in use, from the surrounding sea and in part because incident detecting radiation tends to be reflected away from the source of that radiation.

The structure may conveniently be made of stainless steel, the exterior surfaces thereof being polished to render them highly reflective. The pyramidal form may be polygonal in cross-section and the exterior surfaces formed by the base facet and side facets of the polygonal form may be planar or curved, either concave or convex, preferably with relatively large radius of curvature and preferably generally spherical.

It will be understood that because the hollow structure requires to be connected to the top end of a periscope mast to enable transmission of signals from the interior of the hollow structure through the bore of the hollow mast, the apex of the pyramidal form is virtual (i.e. the pyramid is truncated) and, in use, the virtual apex is maintained below the surface of the sea.

In order to enable transmission of radiation along a line of sight determined by an optical device located within the hollow structure and forming part of the periscope, at least one base or side facet of the pyramidal form incorporates a window which, if the optical device operates in the visible waveband, would be made of glass. In order to heat the window to maintain freedom from condensation a conductive wire array or film may be buried in the glass. Each base or side facet of the pyramidal form may contain one or more windows for radiation transmission. One or more windows may be transmissive to infrared radiation and conveniently may be made of germanium.

In the case where a window is made of glass primarily transmissive only in the visible waveband, this window would have an emission of infrared radiation, which would cause the window to function like an image of the sea mirrored in the facet of the structure containing the window and would therefore be difficult to distinguish. The presence of a conductive wire array or film in the glass would cause detecting microwaves to be reflected as a continuation of the facet containing the window, and to visible detecting radiation would appear as a black hole but of a size sufficiently small in comparison to the remainder of the structure as to be very difficult to detect.

In the case where a planar window is made of an infrared transmitting material the window would behave as a reflector in both visible and radar wavelengths and would behave as a retro-reflector or black hole in the infrared region. It is preferred that an optical device in the form of a thermal imager or visual device located within the hollow structure be so arranged as to have its line of sight non-orthogonally disposed with respect to the general plane of the facet containing the window.

An embodiment of the present invention will now be described, by way of example, with reference to the accompanying schematic drawings in which:

FIG. 1 pictorially illustrates apparatus according to the present invention;

FIG. 2 illustrates a side view of the FIG. 1 apparatus; and

FIG. 3 illustrates a top view of the FIG. 1 apparatus.

As is shown in FIG. 1 apparatus for forming a periscope head comprises a hollow structure 10 which is of inverted pyramidal form, in this case having a triangular base 11 and three side facets 12 one of which incorporates a window 13 enabling transmission of radiation to an optical device (not shown) located within the structure and having a line of sight 14. In use, the structure is mounted at the top end of a periscope mast and is arranged to protrude only in part through the surface of the surrounding seas 15 and the external surfaces of facets 11, 12, are rendered highly reflective and thereby, throughout the visible infrared and radar regions of the spectrum, function as mirror surfaces.

As is shown in FIG. 2, the base facet 11 is convex with large radius of curvature so as to provide a shallow spherical surface which subtends only a small target area for detection by third party marine observers. To overhead observers surface 11 would function to reflect the sky as does the surface of the surrounding seas 15. Each of side facets 12 is effectively inclined at an angle $\phi$ to the surface 15A of the seas 15 when the seas are calm. Angle $\phi$ is not equal to 90°. As measured with respect to the axis of the mast 18 the side facets 12 are inclined at an angle which is not equal to zero because of the pyramidal form of structure 10 so that a beam of detecting radiation such as beam a is reflected as beam a' and incident beam b is reflected as beam b', neither of which returns to the source of the respective beam a,b. In the case where the seas 15 are not calm sea-scattered detective radiation reflected by a facet 12 to the source of the detection radiation would have the same features and therefore be indistinguishable from directly seareflected radiation.

As is also shown in FIG. 2, structure 10 is mounted at the top end of a periscope mast 18 in the vicinity of the apex of the pyramidal form (which is truncated and therefore the apex is virtual) by means of a clamping collar 19 and there is a continuous passageway along the bore of mast 18 to the interior of structure 10 for the transmission of signals therealong. In a modification the passageway is not continuous by virtue of a bulkhead provided to isolate the periscope mast from the periscope head in the event of the latter becoming damaged and thereby admitting sea water. In this case signal transmission through the bulkhead is effected by electrical cables in water-tight glands.

FIG. 3 illustrates the presence of window 13 in one of the side facets 12 and an optical device 20 located within structure 10 and defining the line of sight 14 extending through the window 13 at an angle $\theta$ with respect to the general plane of the facet 12 containing window 13, $\theta$ not being equal to 90°.

The apparatus 10 at least in the visual, thermal and radar wavelength regions primarily presents images of the seas and is therefore difficult for other parties to distinguish the presence of structure 10 from the seas 15. Any reflected detecting radiation, which may be reflected by a facet 12, depends upon the aperture of the reflector and the wavelength of the radiation. To a first approximation, for 18 GHz radiation incident upon a 43 cm high facet a return beam width in the vertical plane of about 2° would result and with structure 10 being of pyramidal form where angle $\phi$ is not 90° there is a very low probability of any part of this narrow return beam returning to the beam source for detection as indicated in FIG. 2 even when seas 15 are calm and even when angle $\phi$ is as large as 85° or so. Rough or choppy seas 15 introduce modulation of the direction of the return beam thereby further reducing the probability of detection and in the event that the longitudinal axis of the periscope is inclined to the vertical such that the angle between a facet and the surface 15A of the seas is 90° so that all or part of the return beam width is returned to source as viewed in the vertical plane there is a low probability of detection azimuthally. For example, at 18 GHz a 12 cm wide facet would give rise to an 8° wide return beam, so that for structure 10 having only three facets the three 8° zones of detectability accumulate to 24° out of the entire 360° periphery which gives rise to a maximum azimuthal detectability factor of only about 7%.

What is claimed is:

1. A periscope head comprising:
   a hollow structure in the form of a single inverted pyramid which is truncated in the vicinity of the apex thereof and is adapted thereat for connection to a conventional periscope mast,
   the pyramidal structure having a single base facet and a plurality of side facets each of which facets is exteriorly highly reflective,
   one of said facets incorporating within its peripheral confines a window for transmission of radiation to an optical device located within said hollow structure and forming part of the periscope.

2. Apparatus as claimed in claim 1, wherein at least one of said facets is planar.

3. Apparatus as claimed in claim 1, wherein at least one of said facets is curved.

4. Apparatus as claimed in claim 1, wherein said window is made of infrared transmitting material.

5. Apparatus as claimed in claim 1, wherein each said side facet is inclined with respect to the axis of said periscope mast at an angle of approximately 5 degrees.

6. Apparatus as claimed in claim 1, wherein said window is located in one of said side facets.

7. Apparatus as claimed in claim 1, wherein said window is made of glass substantially transmissive to visible radiation, said window including heating means to free the glass from condensation.

* * * * *